US012609405B2

(12) United States Patent (10) Patent No.: US 12,609,405 B2
Kim et al. (45) Date of Patent: Apr. 21, 2026

(54) ELECTRODE FOR SECONDARY BATTERY WITH IMPROVED SAFETY, MANUFACTURING METHOD THEREOF, AND SECONDARY BATTERY INCLUDING SAME ELECTRODE

(71) Applicant: LG Chem, Ltd., Seoul (KR)

(72) Inventors: Hye Bin Kim, Daejeon (KR); Hyeok Moo Lee, Daejeon (KR); Song Taek Oh, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 122 days.

(21) Appl. No.: 16/491,047

(22) PCT Filed: Nov. 6, 2018

(86) PCT No.: PCT/KR2018/013353
§ 371 (c)(1),
(2) Date: Sep. 4, 2019

(87) PCT Pub. No.: WO2019/088795
PCT Pub. Date: May 9, 2019

(65) Prior Publication Data
US 2020/0020906 A1 Jan. 16, 2020

(30) Foreign Application Priority Data

Nov. 6, 2017 (KR) ........................ 10-2017-0146387
Nov. 5, 2018 (KR) ........................ 10-2018-0134596

(51) Int. Cl.
*H01M 4/04* (2006.01)
*H01M 4/13* (2010.01)
(Continued)

(52) U.S. Cl.
CPC ........... *H01M 50/342* (2021.01); *H01M 4/66* (2013.01); *H01M 4/70* (2013.01); *H01M 4/8828* (2013.01)

(58) Field of Classification Search
CPC .......... H01M 4/742; H01M 4/74; H01M 4/64; H01M 4/00; H01M 4/02; H01M 4/06;
(Continued)

(56) References Cited

U.S. PATENT DOCUMENTS

2004/0043289 A1* 3/2004 Shimamura ......... H01M 50/562
429/153
2012/0244444 A1* 9/2012 Chiang ............... H01M 10/052
429/188
(Continued)

FOREIGN PATENT DOCUMENTS

CN 2328101 Y * 7/1999
CN 105986288 A 10/2016
(Continued)

OTHER PUBLICATIONS

Kawaguchi Junji, Komatsu Hiroshi, Matsuura Atsushi, Sawada Hirokazu; "Current collector for aluminum plate and power storage device", EPO Machine Translation of KR 20170118806A (Year: 2017).*
(Continued)

*Primary Examiner* — Allison Bourke
*Assistant Examiner* — Charlene Bermudez
(74) *Attorney, Agent, or Firm* — Morgan, Lewis & Bockius LLP

(57) ABSTRACT
The present invention relates to an electrode for a secondary battery having improved safety, a method for manufacturing the electrode, and a secondary battery including the electrode. The secondary battery according to the present invention includes a plurality of apertures that penetrate a current
(Continued)

20

21 collector and an electrode active material layer in a thickness direction. The electrode may improve safety by preventing or minimizing the occurrence of ignition or explosion when a sharp object such as a nail penetrates into the interior of a battery, thereby improving safety of the battery.

12 Claims, 2 Drawing Sheets

(51) Int. Cl.

| | | |
|---|---|---|
| *H01M 4/139* | (2010.01) | |
| *H01M 4/66* | (2006.01) | |
| *H01M 4/70* | (2006.01) | |
| *H01M 4/74* | (2006.01) | |
| *H01M 4/88* | (2006.01) | |
| *H01M 10/052* | (2010.01) | |
| *H01M 50/342* | (2021.01) | |

(58) Field of Classification Search
CPC ............ H01M 4/08; H01M 4/10; H01M 4/12; H01M 4/13; H01M 4/14; H01M 4/24; H01M 4/80; H01M 4/04; H01M 4/0404; H01M 4/0409; H01M 4/0414; H01M 4/0416; H01M 4/0419; H01M 4/043; H01M 4/0438; H01M 4/0473; H01M 4/0478; H01M 4/048; H01M 10/052; H01M 10/0525; H01M 2004/021; H01M 4/139; H01M 4/36; H01M 4/362; H01M 4/62; H01M 2004/026; H01M 4/75; H01M 4/801; H01M 4/0433; H01M 4/0435

See application file for complete search history.

(56) References Cited

U.S. PATENT DOCUMENTS

| | | | | |
|---|---|---|---|---|
| 2013/0177792 A1* | 7/2013 | Takahata | ........... | H01M 10/0587 |
| | | | | 429/94 |
| 2018/0013148 A1* | 1/2018 | Matsuura | ................ | C22C 1/026 |
| 2018/0198132 A1* | 7/2018 | Liang | .................... | H01M 4/663 |
| 2018/0212249 A1* | 7/2018 | Lee | ......................... | H01M 4/70 |

FOREIGN PATENT DOCUMENTS

| | | | | | |
|---|---|---|---|---|---|
| CN | 106654289 | A | * | 5/2017 | |
| CN | 108493393 | A | * | 9/2018 | |
| EP | 0884793 | A1 | | 12/1998 | |
| JP | H10-321238 | A1 | | 12/1998 | |
| JP | 2005-285607 | A | | 10/2005 | |
| JP | 2010232404 | A1 | * | 10/2010 | |
| JP | 2011-009203 | A | | 1/2011 | |
| JP | 2012-238469 | A | | 12/2012 | |
| JP | 5325283 | B2 | | 10/2013 | |
| JP | 2015195144 | A | * | 11/2015 | |
| JP | 2015-216097 | A | | 12/2015 | |
| KR | 10-2013-0055712 | A | | 5/2013 | |
| KR | 10-2013-0116828 | A | | 10/2013 | |
| KR | 10-2017-0034570 | A | | 3/2017 | |
| KR | 20170118806 | A | * | 10/2017 | ............ C25D 11/08 |
| WO | 2011078087 | A1 | | 6/2011 | |
| WO | 2017/052200 | A1 | | 3/2017 | |
| WO | WO-2017188021 | A1 | * | 11/2017 | |

OTHER PUBLICATIONS

Shinmyo Kenichi; Teranishi Rie; Toyokawa Takuya; "JP2015195144A Manufacturing Method of Electrode, Manufacturing Method of Lithium Ion Secondary Battery, and Lithium Ion Secondary Battery", Espacenet Machine Translation (Year: 2015).*

Zhou Zhongbin; "CN2328101Y Perforated steel strip for battery plate"; Espacenet Machine Translation (Year: 1999).*

Abe et al; "Electrochemical Element Electrode and Lithium Ion Secondary Battery"; WIPO IP Portal; Machine Translation of WO 2017/188021 (Year: 2017).*

Abe et al; "WO2017188021—Electrochemicalelement Electrode and Lithium Ionsecondary Battery"; Machine translation of WO-2017188021-A1 obtained from WIPO IP Portal (Year: 2017).*

Zhou et al; CN108493393A Novel coating process; Machine translation of CN-108493393-A obtained from ESpacenet (Year: 2018).*

Abe et al; "Electrode for electrochemical element and lithium ion secondary battery"; Machine translation of WO 2017188021 A1 obtained from Google Patents (Year: 2017).*

Tang et al; "CN106654289A Porous aluminum-foil cathode, preparation method of porous aluminum-foil cathode and lithium secondary battery"; Machine translation of CN 106654289 A obtained from ESpacenet Patent Translate (Year: 2016).*

Toyomasu et al; "1. JP2010232404—Electricity Storage Device Element, and Lithium Ion Capacitor"; Machine translation of JP 2010232404 A1 obtained from WIPO IP Portal (Year: 2010).*

Extended European Search Report issued in a corresponding European Patent Application No. 18874662.2 dated Mar. 20, 2020.

* cited by examiner (a)

(b)

ELECTRODE FOR SECONDARY BATTERY WITH IMPROVED SAFETY, MANUFACTURING METHOD THEREOF, AND SECONDARY BATTERY INCLUDING SAME ELECTRODE

CROSS-REFERENCES TO RELATED APPLICATIONS

This application is a U.S. national phase application, pursuant to 35 U.S.C. § 371, of PCT/KR2018/013353, filed Nov. 6, 2018, designating the United States, which claims priority to Korean Application No. 10-2017-0146387, filed Nov. 6, 2017, and Korean Application No. 10-2018-0134596, filed Nov. 5, 2018. The entire contents of the aforementioned patent applications are incorporated herein by this reference.

TECHNICAL FIELD

The present invention relates to an electrode for a secondary battery having improved safety, a method for manufacturing the electrode, and a secondary battery including the electrode, and more particularly to an electrode for a secondary battery having improved safety by preventing or minimizing the occurrence of ignition or explosion when a sharp object such as a nail penetrates into the interior of a battery, a method for manufacturing the electrode, and a secondary battery including the electrode.

BACKGROUND ART

In recent years, as demand for portable electronic products such as notebook computers, video cameras, portable telephones, and the like rapidly increases and electric vehicles, storage batteries for energy storage, robots, satellites, and the like are developed, studies on high-performance secondary batteries capable of being repeatedly recharged have been actively performed.

The currently commercialized secondary rechargeable batteries include nickel-cadmium batteries, nickel-hydrogen batteries, nickel-zinc batteries, and lithium secondary batteries. Among them, the lithium secondary battery has an advantage over the nickel-based secondary battery due to almost no memory effect, flexible charging and discharging, significantly low self-discharge rate, and high energy density.

Since such a secondary battery, especially a lithium secondary battery, stores a large amount of energy, there is a possibility that fire or explosion may occur due to an external impact. In particular, a secondary battery having low physical durability such as a pouch type secondary battery is vulnerable to an external impact, and the risk of ignition or explosion is greater than a can-type secondary battery. In addition, in recent years, a secondary battery is often used as a battery pack including a plurality of battery cells rather than a single battery cell. Since such a battery pack has a higher capacity or higher output than a single battery cell, it is more likely to ignite or explode, and if the ignition or explosion occurs, the risk also becomes greater than the single battery cell.

Such an ignition and explosion are often caused by a short circuit in a battery cell or between a battery cell and a battery cell when a sharp object such as a nail penetrates into the battery. There is a need to prevent ignition or explosion of the battery, even under such circumstances, to secure the safety of the battery.

As for a method for securing safety against penetration of a sharp object, a method of attaching a separate element to the outside of the cell and a method of using a material inside the cell have been mainly researched and developed. PTC devices that use temperature changes, protection circuits that use voltage changes, and safety vents that use changes in the pressure in the battery are among the former methods, and adding a substance that can change physically, chemically, or electrochemically in response to temperature or voltage change inside the battery is among the latter methods.

The devices mounted on the outside of the cell use a temperature, a voltage and an internal pressure to provide a reliable cutoff, but require additional installation process and installation space, and it is known that the devices cannot provide a protection at situations requiring a quick response, such as an internal short circuit, penetration of a sharp object, and a local damage.

On the other hand, as for a method of using a substance inside a cell, a chemical safety device for adding an additive for improving the safety to an electrolyte or an electrode is being studied, which does not require a space and can be applied to all kinds of batteries. However, it has been reported that a material which forms a floating film on the electrode is generated, or the resistance of the electrode is increased due to the volume expansion when the temperature rises. Therefore, this method has a problem in that byproducts are generated during the formation of the floating film, thereby deteriorating the performance of the battery, or the volume of the battery is large, thereby reducing the capacity of the battery.

Therefore, it is still necessary to develop a technology for preventing ignition or explosion due to infiltration or penetration of a sharp object. Furthermore, as the demand for high output and high energy density of batteries increases, the risk of ignition and explosion increases further, and measures for safety are more urgent.

In order to meet the safety requirements of the secondary battery, the present applicant has already developed various techniques and filed patent applications after repeatedly studying various aspects. For example, Patent Document 1 (Korean Patent Laid-Open Publication No. 10-2017-0034570) filed by the present applicant provides an invention about setting the elongation of a positive electrode to a specific range (i.e., 0.6 to 1.5%) in order to improve the safety of a secondary battery. However, this invention does not specifically disclose a configuration or a method for realizing a positive electrode having such elongation.

DISCLOSURE

Technical Problem

Accordingly, the present invention is intended to solve the problems of the prior art as described above, and an object of the present invention is to provide an electrode for a secondary battery which can further improve the safety of the battery by preventing or minimizing the occurrence of ignition or explosion of the battery even when a sharp object such as a nail penetrates into the interior of the battery.

Another object of the present invention is to provide a method for efficiently manufacturing an electrode for a secondary battery and a secondary battery including such an electrode.

Technical Solution

In order to achieve the above-mentioned object, the inventors of the present application have found that, in order to prevent ignition or explosion of a battery due to a short circuit of the battery when a sharp object enters the interior of the battery, the possibility of contact or the contact area between the sharp object and the electrode and between the positive electrode and the negative electrode should be reduced as much as possible, and to this end, control of the physical or mechanical properties of the electrode may be effective. In other words, since when a sharp object enters into the battery, an electrode (particularly an electrode current collector) is elongated to thereby contact the opposite electrode and cause a short circuit, lowering the elongation of the electrode as one of the physical properties may break the electrode more easily, which may reduce the possibility of contact between the electrodes and between the electrode and the sharp object, thereby reducing the possibility of a short circuit. Studies have been performed based on the foregoing consideration. However, in terms of lowering the elongation rate of the current collector material, there was a limit due to a requirement of the electrode and the electrode manufacturing process. After repeatedly studying various other aspects, the inventors of the present invention have found a new method for reducing the elongation characteristics of electrodes and have completed the present invention based thereon.

It is already known that when an aperture that penetrates the active material and the electrode assembly in the thickness direction is formed by a specific method at the time of preparing an electrode, the impregnation property of the electrolyte solution is improved or the discharging rate of gas generated during charging and discharging is improved. In the case of the above method, the above-mentioned effect can be significantly shown when applied to the electrode of the jelly roll type electrode assembly incorporated in the stacked electrode assembly or the can type secondary battery having a slow electrolyte dispersion rate due to high density.

However, while repeating the experiment for reducing the elongation characteristic, the applicant of the present invention has discovered that when the through apertures are formed in the electrode in a specific pattern, it is possible to reduce the elongation characteristic of the electrode in addition to improving the electrolyte impregnation property and the discharge of gas, and accordingly, the present invention has been completed. When the electrode according to the present invention is used, it is possible to overcome the limitations of the prior art in which the elongation rate of the material itself is decreased, and the elongation of the electrode may be further decreased, thereby greatly reducing the risk of short circuit and ignition due to the penetrations of a sharp object.

Hence, in order to achieve the above objects, an electrode for a secondary battery includes a current collector and an electrode active material layer formed on one side or both sides of the current collector, wherein a plurality of apertures that penetrate the current collector and the electrode active material layer are formed in a thickness direction.

In a preferred embodiment of the present invention, the apertures may have a lateral cross-section of one or more selected from a group consisting of circular, oval, and polygonal cross-sectional shapes and may have diameters preferably between 100 μm and 5 mm and more preferably between 400 μm and 1 mm.

Further, the apertures may be preferably formed on the entire surface of the electrode at the interval of, for example, 1 mm to 8 mm. Herein, the array pattern of the apertures may be regular or irregular, but it is preferable that the unit pattern may be formed to be a rectangle (including square) or an equilateral triangle, which is repeatedly arranged.

Further, a method for manufacturing an electrode for a secondary battery according to the present invention may include the steps of (1) applying an electrode slurry that contains an electrode active material on an electrode current collector and drying the electrode slurry to form an electrode active material layer and (2) rolling the electrode active material layer, wherein the method further includes a step of forming a plurality of apertures that penetrate the electrode current collector and the electrode active material layer in a thickness direction after or simultaneously with the step (2).

The aperture forming step may preferably be performed in such a manner that the electrode is pressed using a roller having a perforation means formed on its outer circumferential surface. The aperture forming process may be performed after the rolling process of the step (2), or may be performed at the same time as the rolling process using the roller used for the rolling process of the electrode as the roller having the perforation means formed on the outer circumferential surface.

The secondary battery according to the present invention may include a positive electrode, a negative electrode, a separator and an electrolyte, wherein one or both of the positive electrode and the negative electrode is the electrode prepared according to the present invention. The positive electrode is preferably the electrode prepared according to the present invention.

Advantageous Effects

According to the present invention, the elongation of the electrode is decreased by forming an aperture that penetrates through the electrode in the thickness direction as described above. Accordingly, when a sharp object such as a nail penetrates into the battery, the breakage of the electrode easily occurs, and a possibility of contact or an area of contact between the electrodes and between the electrode and the sharp object is decreased, thereby preventing or reducing a short circuit. Therefore, the possibility of ignition or explosion of the battery is significantly decreased, and the safety of the battery is improved.

DETAILED DESCRIPTION OF THE PREFERRED EMBODIMENTS

Figure 1:
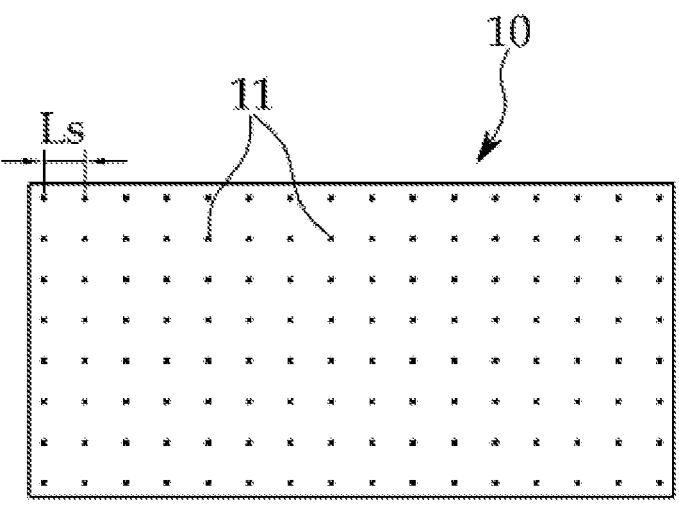
FIGS. 1A and 1B are schematic plan views showing examples of aperture array patterns formed according to an embodiment of the present invention.
Figure 1:
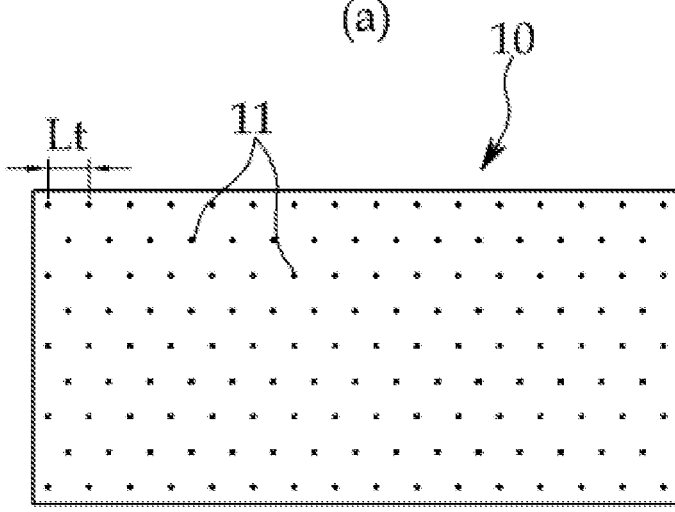

Hereinafter, the present invention will be described in detail. It is to be understood that the following detailed description and drawings are merely illustrative of the embodiments of the present invention, and therefore the present invention should not be construed as being limited to the description and contents.

First, the terms used in the present invention are described below. The "elongation rate (%)" in the present invention refers to the percentage of the elongation after stretching relative to the original length as in a common definition, but since the present invention is applied to a planar object rather than a linear object, the concept includes both a longitudinal elongation and a lateral elongation. The elongation rate may be different for the longitudinal elongation and for the lateral elongation. In this case, the longitudinal elongation and the lateral elongation are arithmetically averaged. For example, when the longitudinal elongation of the electrode is 2% and the lateral elongation is 4%, the elongation of the electrode is 3%.

An electrode for a secondary battery according to the present invention is an electrode including a current collector and an electrode active material layer formed on one surface or both surfaces of the current collector and having a plurality of apertures that penetrate the current collector and the electrode active material layer in the thickness direction.

In a specific embodiment of the present invention, the shape of the apertures is not particularly limited, but the shape of the cross-section may be circular, elliptical, polygonal, or the like, and is preferably a substantially circular cross-section.

Further, the diameter of the apertures may be preferably 100 μm to 5 mm, more preferably 400 μm to 1 mm, and the apertures are preferably formed on the entire surface of the electrode at predetermined intervals. Preferably, when viewed in a plan view, the total area of the apertures may be 10 to 70%, more preferably 20 to 40% of the total area of the electrode.

When the diameter and total area of the apertures are smaller than the above range, the effect of decreasing the elongation is pronounced. On the other hand, when the total diameter and area of the apertures are larger than the above range, the amount of the electrode active material decreases, which may lead to the decrease of the battery capacity.

The array pattern of the apertures may be regular or irregular, but preferably the unit shape of the array of apertures 11 may be a square (in the case of FIG. 1A) or an equilateral triangle (in the case of FIG. 1B), which may be repeatedly formed on the electrode (10). In this case, it is preferable that the aperture interval Ls in the longitudinal direction of the sides of the square shape and the aperture interval Lt in the longitudinal direction of the sides of the regular triangle shape are 1 to 8 mm, and each aperture is preferably circular shape of a diameter of 100 μm to 5 mm.

Thickness, shape, or the like of electrode current collector, especially positive electrode current collector and negative electrode current collector, the composition of the slurry for forming the electrode active material layer, particularly the positive electrode active material layer and the negative electrode active material layer, type of active material, particle size, porosity of the active material layer, and the like according to the present invention are well known in the art and are not particularly limited. Those skilled in the art can easily use the knowledge to understand and acquire the matters related thereto and for the present invention, and therefore, a detailed description thereof will be omitted. In this regard, for example, Patent Document 1 (Korean Patent Laid-Open Publication No. 10-2017-0034570) and Patent Document 2 (Korean Patent Laid-Open Publication No. 10-2013-0055712), which are patents of the present applicant, can be referred to, and the entire contents of these documents are incorporated herein by reference to the extent not inconsistent with the present invention.

However, the positive electrode current collector may be made of stainless steel, aluminum, nickel, titanium, sintered carbon, or aluminum or stainless steel surface treated with carbon, nickel, titanium or silver, but in the present invention, aluminum is preferably used for the purpose of reducing the elongation as much as possible. On the other hand, the negative electrode current collector may be made of copper, stainless steel, aluminum, nickel, titanium, baked carbon, surface of copper or stainless steel surface-treated with carbon, nickel, titanium, silver, or the like, aluminum-cadmium alloy, or the like, and considering various aspects, the copper foil, which is widely used as a negative electrode current collector, has a considerably large elongation, and therefore it is not easy to achieve a desired level of elongation by the constitution of the present invention. Therefore, since the above-mentioned aluminum is widely used as a positive electrode material in other aspects, the present invention can be more effective when applied to a positive electrode than a negative electrode.

As described above, according to the present invention, since a plurality of apertures are formed in the electrode, the elongation rate of the electrode is decreased (this may be because the breaking strength of the electrode is weakened due to a large number of apertures), the effect of decreasing the elongation rate may vary depending on the materials used for the electrodes, the size of the apertures, the formed area, and the like, but according to the present invention, the elongation can be reduced to a level of 50% or less compared to prior to the aperture formation. The electrode of the present invention having the reduced elongation as described above may preferably have an elongation of 1.0% or less, more preferably 0.4% to 0.8%, and most preferably 0.4 to 0.5%. When the elongation is 0% or excessively low, not only it is difficult to realize, but also there is a risk that the electrode may be broken in a process such as rolling. Therefore, the elongation of the electrode is preferably at least 0.3% or more.

On the other hand, in order to ensure safety against penetration of a sharp object, it is desirable that the elongation of the positive electrode and the negative electrode is small, and the elongation of the separator is large (for example, if the separator has an elongation lower than an elongation of the electrode current collector, the positive electrode and the negative electrode are more likely to come into contact with each other). When the electrode of the present invention as described above is used, if a sharp object such as a nail penetrates into the battery, the resistance of the electrode against the penetration of the sharp object is large, and if exceeding the resistance, the electrode is broken without being elongated, and the possibility of contact and the area of contact between the electrodes and between the electrode and the sharp object is decreased, and therefore the possibility of ignition or explosion is significantly decreased.

Next, a method of manufacturing an electrode for a secondary battery according to the present invention will be described. According to an embodiment, a method of manufacturing an electrode of the present invention includes the steps of (1) applying an electrode slurry that contains an electrode active material on an electrode current collector, and drying the electrode slurry to form an electrode active material layer; and (2) rolling the electrode active material layer, and the step of forming a plurality of apertures that penetrate through the electrode current collector and the active material layer in the thickness direction may be additionally included.

Figure 2:
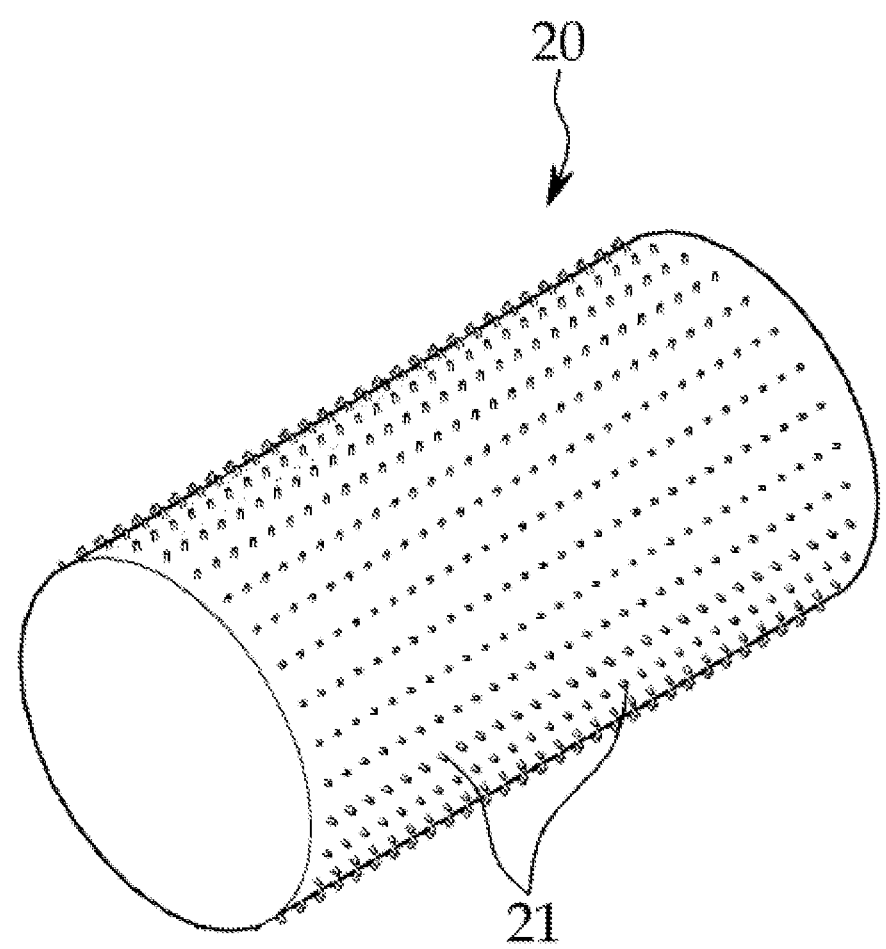
FIG. 2 is a schematic perspective view showing an example of a roller used in the aperture forming step of the present invention.

The apertures may be formed by any method known in the art. For example, the apertures may be formed by pressing the electrode using a pressing device having a perforation means on the pressing die, but preferably, as shown in FIG. 2, the apertures may be formed by pressing the electrode using a roller 20 on the outer circumferential surface of which the perforation means 21 is formed as used in the electrode rolling process. Such an aperture forming step may be performed after the rolling step of step (2), or may be performed simultaneously with the rolling step using a roller having a perforation means formed on the outer peripheral surface thereof as a roller used in the rolling step. The latter method is preferable in terms of process efficiency.

The pattern for forming the perforation means in the roller may be formed correspondingly to the pattern of the apertures to be formed in the electrode. The perforation means can be used without particular limitation as long as it can form an aperture by pressing the current collector and the active material layer of the electrode. The perforation means may be, for example, a pin, a needle, a rod, a tube or the like capable of forming an aperture by pressurization.

In the electrode manufacturing method of the present invention, the electrode active material layer forming step, rolling step, and the like are conventional steps known in the art, and can be applied to the present invention without any particular limitation, and those skilled in the art can easily understand and obtain the present invention, so that detailed description thereof will be omitted. In this regard, for example, Patent Documents 1 and 2 may be referred to as described above.

The present invention further provides a secondary battery, in which the secondary battery includes a positive electrode, a negative electrode, a separator, and an electrolyte, in which one or both of the positive electrode and the negative electrode is an electrode according to the present invention described herein. In particular, it is preferable that the positive electrode is the electrode according to the present invention for the reasons described above.

The separator, the electrolyte, and the like that constitute the secondary battery of the present invention are well known in the art and can be used in the present invention without any particular limitation, and those skilled in the art can easily understand and obtain them, and therefore detailed descriptions thereof are also omitted. In this regard, for example, Patent Documents 1 and 2 may be referred to as described above.

Hereinafter, the present invention will be described in more detail through examples. The following examples are for illustrative purposes only and are not intended to limit the scope of the present invention.

The present invention provides an electrode in which a plurality of apertures that penetrate the current collector and the electrode active material layer in the thickness direction are formed in order to reduce the elongation characteristics. Accordingly, a positive electrode and a negative electrode having an aperture according to the present invention were prepared as follows. On the other hand, as a control group, a positive electrode and a negative electrode were prepared in the same manner except that no aperture was formed.

PREPARATION EXAMPLE OF POSITIVE ELECTRODE

Preparation Example 1 (Positive Electrode 1)

An aluminum foil having a thickness of 12 μm and an elongation of 2.5% was prepared as a positive electrode current collector.

In addition, $LiNi_{0.6}Mn_{0.2}Co_{0.2}O_2$ (average particle diameter: 14 μm) as a positive electrode active material, PVDF as a binder and Denka black as a conductive material were dissolved in a solvent of N-methylpyrrolidone (NMP) at the composition ratio of 93:4:3 to prepare a positive electrode slurry for forming a positive electrode active material layer.

The positive electrode slurry was coated on both sides of the aluminum foil, dried and rolled to produce a positive electrode.

The positive electrode was pressed with a roller as shown in FIG. 2 to form apertures. In particular, the apertures have a circular cross section with a diameter of 500 μm, and the array pattern of the apertures is a square pattern as shown in FIG. 1A, and the aperture interval Ls in the longitudinal direction of the sides is 1 mm.

The positive electrode thus produced finally had a total thickness of about 125 μm (one of the active material layers had a thickness of about 56 μm) and a porosity of 25%.

Preparation Example 2 (Positive Electrode 2)

A positive electrode was prepared in the same manner as in Example 1 except that the aperture interval (Ls) was 5 mm.

Preparation Example 3 (Positive Electrode 3)

A positive electrode was prepared in the same manner as in Example 1 except that the aperture interval (Ls) was 10 mm.

Preparation Example 4 (Positive Electrode 4)

A positive electrode was prepared in the same manner as in Example 1 except that no aperture was formed.

PREPARATION EXAMPLE OF NEGATIVE ELECTRODE

Preparation Example 5 (Negative Electrode 1)

A copper foil having a thickness of 10 μm and an elongation of 3.5% as a negative electrode current collector was prepared.

In addition, a slurry for forming a negative electrode active material layer was prepared by mixing natural graphite as a negative electrode active material, SBR and CMC as a binder, and Denka black as a conductive material in water as a solvent at a composition ratio of 97:2:1.

The negative electrode slurry was coated on both sides of the negative electrode current collector, dried and rolled to produce a negative electrode.

Apertures were formed in the negative electrode in the same manner as in Preparation Example 1 (positive electrode 1).

The negative electrode thus produced finally had a total thickness of about 150 μm (one of the active material layers had a thickness of about 70 μm) and a porosity of 35%.

Preparation Example 6 (Negative Electrode 2)

A negative electrode was prepared in the same manner as in Preparation Example 5 except that no aperture was formed.

Measurement of Elongation of Electrode

The elongation was measured for the positive electrode and the negative electrode according to the respective preparation examples. In particular, the elongation was measured by UTM equipment, and the longitudinal elongation and lateral elongation were measured at a rate of 0.5 mm/min, and then the arithmetic mean thereof was defined as the elongation of the prepared electrode. The elongation measurement results of the positive electrode and the negative electrode according to each preparation example are shown in Table 1 below.

TABLE 1

| Electrode preparation example | Elongation of curent collector | Diameter of apertures (μm) | Interval of apertures (mm) | Elongation of prepared electrode |
|---|---|---|---|---|
| Preparation Example 1 (positive electrode 1) | 2.5% | 500 | 1 | 0.5% |
| Preparation Example 2 (positive electrode 2) | 2.5% | 500 | 5 | 0.8% |
| Preparation Example 3 (positive electrode 3) | 2.5% | 500 | 10 | 1.2% |
| Preparation Example 4 (positive electrode 4) | 2.5% | — | — | 1.5% |
| Preparation Example 5 (negative electrode 1) | 3.5% | 500 | 1 | 2.0% |
| Preparation Example 6 (negative electrode 2) | 3.5% | — | — | 2.5% |

As shown in Table 1, in the case of Preparation Example 1 (positive electrode 1) having an aperture interval of 1 mm, the elongation was 0.5%, which was only one fifth of the elongation of the current collector. This is also significantly bined to prepare a secondary battery according to the procedures of Examples and Comparative Examples shown in Table 2 below, and a nail penetration test was performed after manufacturing the secondary battery to observe whether or not ignition occurred.

Preparation of Pouch Type Mono-Cell

The secondary batteries according to each of the Examples and Comparative Examples were prepared in the same manner as described below except for the Preparation Example combination of the positive electrode and the negative electrode.

A positive electrode and a negative electrode of each of Examples and Comparative Examples were selected and used as an electrode according to the Preparation Example shown in Table 2 below. An electrode assembly was prepared by interposing a separator made of polyethylene between the positive electrode and the negative electrode.

The electrode assembly was housed in a pouch, and then an electrolytic solution composed of ethylene carbonate (EC):dimethyl carbonate (DMC):ethyl methyl carbonate (EMC)=3:4:3 and 1M $LiPF_6$ was injected to prepare a pouch type mono-cell.

Nail Penetration Test

The nail penetration test was performed on the mono-cell prepared as described above. Prior to the experiment, each mono-cell was fully charged at a voltage of 4.15 V at 25° C. The mono-cell was pierced through the center at a penetration rate of 80 mm/sec using a nail having a diameter of 3 mm. The results are shown in Table 2 below (O: ignited, X: not ignited).

TABLE 2

| | Positive electrode | | Negative electrode | | Whether |
|---|---|---|---|---|---|
| Division | Preparation example | Elongation | Preparation example | Elongation | ignited |
| Example 1 | Preparation Example 1 (positive electrode 1) | 0.5% | Preparation Example 5 (negative electrode 1) | 2.0% | X |
| Example 2 | Preparation Example 2 (positive electrode 2) | 0.8% | Preparation Example 5 (negative electrode 1) | 2.0% | X |
| Example 3 | Preparation Example 1 (positive electrode 1) | 0.5% | Preparation Example 6 (negative electrode 2) | 2.5% | X |
| Comparative Example 1 | Preparation Example 3 (positive electrode 3) | 1.2% | Preparation Example 5 (negative electrode 1) | 2.0% | ○ |
| Comparative Example 2 | Preparation Example 4 (positive electrode 4) | 1.5% | Preparation Example 6 (negative electrode 2) | 2.5% | ○ | superior to the experimental result of Korean Patent Laid-Open Publication No. 2017-0034570, which is the prior art of the present applicant.

However, in the case of the Preparation Example 5 (negative electrode 1) in which apertures were formed in the same pattern as the Preparation Example 1 (positive electrode), the effect for improving the elongation was lower than the positive electrode. Therefore, it is preferable to apply the present technology to a positive electrode rather than a negative electrode, because it is more effective.

SECONDARY BATTERY PREPARATION AND NAIL PENETRATION TEST ACCORDING TO EXAMPLES AND COMPARATIVE EXAMPLES

The positive electrode and the negative electrode according to each of the above Preparation Examples were com- Example 1

First, a mono-cell was prepared by combining Preparation Example 1 (positive electrode 1) and Production Example 5 (negative electrode 1) having the lowest elongation. Subsequently, a nail penetration test of the above method was performed, and it was observed whether the cell ignited. Because of the low elongation, ignition did not occur even after penetration of a sharp object.

Example 2

Next, a mono-cell was prepared by combining Preparation Example 2 having the elongation of 0.8% (positive electrode 2) and Production Example 5 (negative electrode 1). Subsequently, a nail penetration test of the above method was performed, and it was observed whether the cell ignited. As in Example 1, ignition did not occur.

Example 3

Preparation Example 1 (positive electrode 1) having an elongation of 0.5% and Preparation Example 6 (negative electrode 2) having no decrease in elongation characteristic in which apertures were not formed combined, to thereby carry out an experiment in the same manner as in Example 1. No ignition was observed because of low elongation of the Preparation Example 1 (positive electrode).

Comparative Example 1

Then, an experiment was carried out in the same manner as in Example 1, using Preparation Example 3 (positive electrode 3 having a higher elongation than Example 2 and Preparation Example 5 (negative electrode 1) having a reduced elongation characteristic. Contrary to expectation, there was an ignition. Although the elongation of the negative electrode is lowered, it is considered that if the elongation of the positive electrode is 1.2% or more, ignition may occur. Therefore, it can be seen that lowering the elongation as much as possible by applying the electrode manufacturing method according to the present invention to the positive electrode is most desirable for improving the stability against a sharp object.

Comparative Example 2

The experiment was carried out in the same manner as in Example 1 using the Preparation Example 6 (a negative electrode 2) in which no aperture is formed as in the Preparation Example 4 (positive electrode 4) in which no aperture is formed. It was verified that the ignition occurred as expected and that the method according to the present invention may prevent the risk due to a sharp object.

As can be seen from the above Examples and Comparative Examples, according to the present invention, since a plurality of apertures are formed in the electrode, the elongation of the electrode can be greatly reduced. As such, as a short circuit is prevented or reduced when sharp objects such as nails penetrate into the cell or through the cell, the possibility of ignition or explosion becomes significantly decreased.

INDUSTRIAL APPLICABILITY

As described in detail above, the present invention can prevent or minimize the occurrence of ignition or explosion of the battery even when a sharp object such as a nail penetrates into the battery, thereby further improving the safety of the battery. Therefore, it is industrially very useful.

While the present invention has been particularly shown and described with reference to exemplary embodiments thereof, it will be understood by those skilled in the art that various changes in form and details may be made therein without departing from the spirit and scope of the invention, and it will be apparent to those skilled in the art that addition of components and the like are possible.

Terms such as "approximately" and "about" are not used in the following claims because such terms are not allowed to be used in claims, but terms such as "equilateral triangle" or "rectangle" used in the following claims should be understood to mean "approximately equilateral triangle" or "approximately rectangle".

DESCRIPTION OF SYMBOLS

10: electrode
11: aperture
20: roller
21: perforation means
Ls, Lt: aperture intervals

The invention claimed is:

1. A secondary battery, comprising:
   a positive electrode including:
      a positive current collector; and
      a positive electrode active material layer formed on one side or both sides of the current collector, and
   a negative electrode including:
      a negative current collector; and
      a negative electrode active material layer,
   wherein a first plurality of apertures having diameters between 500 µm and 5 mm that penetrate the positive current collector and the positive electrode active material layer are formed in a thickness direction,
   a second plurality of apertures having diameters between 500 µm and 5 mm that penetrate the negative current collector and the negative electrode active material layer are formed in a thickness direction,
   the first and second plurality of apertures have a lateral cross-section of one or more selected from a group consisting of circular, oval, and polygonal cross-sectional shapes,
   the positive electrode has an elongation of 0.3% to 1.0%, and the negative electrode has an elongation of 2.0 to 2.5%, the elongation being the arithmetic mean of the longitudinal elongation and the lateral elongation measured at a rate of 0.5 mm/min by universal testing machine equipment (UTM) equipment, and
   the first and second plurality of apertures are arranged in a pattern in which a unit pattern of their array is a rectangle or an equilateral triangle, and the unit pattern is repeatedly arranged, an aperture interval in a longitudinal direction of sides in the unit pattern being from 1 mm to 8 mm.

2. The secondary battery of claim 1, wherein the diameter of each of the first and second plurality of apertures is 400 µm to 1 mm.

3. The secondary battery of claim 1, wherein the unit pattern is an equilateral triangle, and an aperture interval in a longitudinal direction of sides of the unit pattern of the equilateral triangle is 1 mm to 8 mm.

4. A method for manufacturing the secondary battery according to claim 1, the method comprising the steps of:
   (1) applying an electrode slurry that contains an electrode active material on the positive current collector and drying the electrode slurry to form the positive electrode active material layer; and
   (2) rolling the electrode active material layer;
   wherein the method further comprises a step of forming the first plurality of apertures that penetrate the positive current collector and the positive electrode active material layer in a thickness direction after or simultaneously with the step (2).

5. The method of claim 4, wherein a roller applies pressure during the rolling step, and a perforating means is applied on an outer circumferential surface of the roller to form the first plurality of apertures.

6. The secondary battery of claim 1, wherein a total area of the apertures is 10 to 70%.

7. The secondary battery of claim 1, wherein a total area of the apertures is 20 to 40%.

8. The secondary battery of claim 1, wherein the positive electrode has an elongation of 0.6% to 1.0%.

9. The secondary battery of claim 1, wherein the positive electrode has an elongation of 0.5% to 1.0%.

10. The secondary battery of claim 1, wherein the positive electrode has an elongation of 0.5% to 0.8%.

11. The secondary battery of claim 1, wherein the diameters of the first and second plurality of apertures are between 500 μm and 1 mm.

12. The secondary battery of claim 1, wherein the aperture interval in the longitudinal direction of the sides in the unit pattern of the positive electrode current collector is 5 mm to 8 mm.

\* \* \* \* \*